United States Patent
Estermann et al.

(10) Patent No.: US 10,723,584 B2
(45) Date of Patent: Jul. 28, 2020

(54) METHOD AND DEVICE FOR ALIGNING PREFABRICATED CABLE ENDS OF A CABLE HARNESS IN CORRECT ROTATIONAL POSITION

(71) Applicant: komax Holding AG, Dierikon (CH)

(72) Inventors: Beat Estermann, Dierikon (CH); Simon Hugener, Untaraegeri (CH)

(73) Assignee: komax Holding AG, Dierikon (CH)

(*) Notice: Subject to any disclaimer, the term of this patent is extended or adjusted under 35 U.S.C. 154(b) by 211 days.

(21) Appl. No.: 15/722,256

(22) Filed: Oct. 2, 2017

(65) Prior Publication Data

US 2018/0093849 A1 Apr. 5, 2018

(30) Foreign Application Priority Data

Oct. 3, 2016 (EP) .................................. 16192006

(51) Int. Cl.
*B65H 69/06* (2006.01)
*H01R 43/20* (2006.01)
(Continued)

(52) U.S. Cl.
CPC ............... *B65H 69/06* (2013.01); *D07B 3/04* (2013.01); *D07B 7/16* (2013.01); *D07B 7/167* (2013.01);
(Continued)

(58) Field of Classification Search
CPC . D07B 3/04; D07B 1/062; D07B 7/16; D07B 7/167; D07B 7/169; B65H 69/06
(Continued)

(56) References Cited

U.S. PATENT DOCUMENTS

| 3,504,488 A | * | 4/1970 | Illman | ................... | B65H 69/068 |
| | | | | | 57/22 |
| 4,341,065 A | * | 7/1982 | Baumgartner | ........ | B65H 69/06 |
| | | | | | 57/22 |

(Continued)

FOREIGN PATENT DOCUMENTS

| DE | 38 22 166 C2 | 7/1989 |
| DE | 10 2014 005242 B3 | 7/2015 |

(Continued)

OTHER PUBLICATIONS

European Office Action in EP 16192006.1-1809, dated Apr. 21, 2017, with English translation of relevant parts.
(Continued)

*Primary Examiner* — Shaun R Hurley
*Assistant Examiner* — Bao-Thieu L Nguyen
(74) *Attorney, Agent, or Firm* — Collard & Roe, P.C.

(57) ABSTRACT

The present invention relates to a method and a device for aligning prefabricated cable ends (111, 121) of a cable strand (100), twisted in particular, with at least two cables (110, 120) in the correct rotational position, wherein the entire cable strand (100) is rotated by means of a rotary gripping device (30) on a section (101) which is connected to the cable ends and is rotated by means of a rotary gripping device (30) in particular, and each cable (110) that has already been aligned remains secured in its ideal rotational position in a section (112) of its free cable end (111), in particular untwisted, by means of a respective cable grip (10, 20).

7 Claims, 9 Drawing Sheets

(51) Int. Cl.
*H01B 13/02* (2006.01)
*D07B 7/16* (2006.01)
*D07B 3/04* (2006.01)
*H01B 13/00* (2006.01)
*H02G 1/12* (2006.01)

(52) U.S. Cl.
CPC ......... *D07B 7/169* (2015.07); *H01B 13/0036* (2013.01); *H01B 13/0207* (2013.01); *H01R 43/20* (2013.01); *H01B 13/0257* (2013.01); *H02G 1/1292* (2013.01)

(58) Field of Classification Search
USPC ........................................................ 140/149
See application file for complete search history.

(56) References Cited

U.S. PATENT DOCUMENTS

| | | | |
|---|---|---|---|
| 4,835,844 A | 6/1989 | Gerst et al. | |
| 5,083,370 A | 1/1992 | Koch et al. | |
| 5,157,830 A | 10/1992 | Koch | |
| 5,237,809 A * | 8/1993 | Oestreich | H01B 13/025 57/204 |
| 6,842,975 B2 * | 1/2005 | Revel | H01R 43/20 29/825 |
| 8,161,721 B2 * | 4/2012 | Chiasson | D07B 3/005 57/293 |
| 8,646,822 B2 * | 2/2014 | Braun | H01R 43/20 269/32 |
| 9,194,079 B2 * | 11/2015 | Kudou | B21F 15/04 |
| 9,416,488 B2 * | 8/2016 | Stier | D07B 3/04 |
| 9,466,111 B2 | 10/2016 | Frey | |
| 9,624,607 B2 * | 4/2017 | Keil | H01B 13/0207 |
| 10,052,676 B2 * | 8/2018 | Keil | H01B 13/0207 |
| 2002/0173204 A1 * | 11/2002 | Yamanashi | H01R 13/4362 439/752 |
| 2012/0324857 A1 * | 12/2012 | Ogawa | B29D 30/48 57/11 |
| 2014/0298770 A1 * | 10/2014 | Kudou | B21F 15/04 57/213 |
| 2015/0101700 A1 * | 4/2015 | Stier | H01B 13/0271 140/149 |
| 2016/0114375 A1 * | 4/2016 | Keil | H01B 13/0207 140/149 |

FOREIGN PATENT DOCUMENTS

| | | |
|---|---|---|
| EP | 0 348 615 A1 | 1/1990 |
| EP | 1 032 095 A1 | 8/2000 |
| EP | 1 317 031 A1 | 6/2003 |
| EP | 1 429 430 A2 | 6/2004 |
| EP | 2 317 613 A1 | 5/2011 |
| EP | 3 012 841 A1 | 4/2016 |
| EP | 3 021 430 A1 | 5/2016 |
| JP | H07-240267 A | 9/1995 |
| WO | 1989/000347 A1 | 1/1989 |

OTHER PUBLICATIONS

European Office Action in EP 16192019.4-1801, dated Mar. 16, 2017, with English translation of relevant parts.

\* cited by examiner

METHOD AND DEVICE FOR ALIGNING PREFABRICATED CABLE ENDS OF A CABLE HARNESS IN CORRECT ROTATIONAL POSITION

CROSS REFERENCE TO RELATED APPLICATIONS

Applicant claims priority under 35 U.S.C. § 119 of European Application No. 16192006.1 filed on Oct. 3, 2016, the disclosure of which is incorporated by reference.

The present invention relates to a method and a device for aligning prefabricated cable ends of a cable strand in particular a twisted cable strand comprising several, i.e., at least two cables in the correct rotational position. The invention also relates to a cable assembly device for assembly of plug housings with prefabricated cable ends of a cable strand comprised of several cables, wherein the cable assembly device has such an aligning device for aligning the prefabricated cable ends in the correct rotational position with respect to the plug housings to be assembled.

Cable harnesses such as those used in automobiles and airplanes, for example, consist of a plurality of cables which are provided with so-called plug housings on the prefabricated cable ends. This is generally referred to as assembly or assembling of the plug housings. To do so the prefabricated cable ends, i.e., cut to length, stripped of insulation and provided with contact parts, are inserted into the chambers, i.e., receptacles of the plug housings.

As a rule the cables of a cable harness with the cable ends to be assembled are provided individually and to this extent are also inserted individually by means of the corresponding mechanical devices into the chambers in the plug housings. To an increasing extent, twisted cable strands comprised of a plurality of individual cables—mainly twisted pairs of cables—are recently also being used to an increasing extent in cable harnesses for which there is also the need to assemble the free cable ends in particular the untwisted and/or stretched cable ends of the cable strand. Twisted cable pairs are produced on cable processing machines, as described in EP 1 032 095 A1, for example, by twisting the two cables of the cable pair together after fabrication, i.e., after cutting to length, stripping off the insulation and crimping of contact parts. Fundamentally such twisted cable pairs can also be produced by fabricating a pretwisted cable pair at the free cable ends. To do so the cable pair is deflected on a suitable cable processing machine, the cable ends at the ends of the cable pair are untwisted, stretched and then fabricated to the final stage (stripping off insulation and crimping the contact parts).

However, for the subsequent assembly of a plug housing with several prefabricated free cable ends on one end of the cable strand, there was the problem that it is impossible to ensure that the contacts on the cable ends are each in the required ideal rotational position/angular position with respect to the chambers of the plug housing. These problems occur in particular with twisted cable strands but also with other cable strands comprised of a plurality of cables, which are combined in any fashion to form an association. However, faulty positioning of the cable ends and/or contacts at the cable ends is unfavorable for assembly, for example, when a contact having a rectangular cross section, for example, is to be fitted into a plug housing having a rectangular chamber. The cable ends must ideally be aligned as accurately as possible in the correct rotational position, so that the assembly operation can be carried out successfully.

EP 1 429 430 A2 discloses a device, which can convert prefabricated cable ends of a single cable to the correct angular position with respect to a housing chamber to be assembled. However, the approach described there for single cables cannot be applied to cable strands from a technical standpoint, in particular twisted cable strands having a plurality of cables, in order to correct the twist of the contacts relative to one another individually at the cable ends.

The object of the present invention is therefore to provide a method and a device with which the prefabricated cable ends of a cable strand, in particular twisted, comprised of at least two or more cables can each be aligned individually in a certain ideal rotational position in the correct rotational position.

This object is achieved by the method described herein and the device described herein. Advantageous embodiments of the invention are also described herein.

The method according to the invention for alignment of the prefabricated cable ends of a twisted cable strand, comprised of at least two cables in the correct rotational position in particular, is characterized by the following steps:

a. Rotating the entire cable strand comprised of at least two cables on a section of the cable strand, in particular a twisted section, connected to the cable ends, for alignment of the free cable end, in particular untwisted, of a cable to be aligned of the at least two cables in a predetermined ideal rotational position with respect to its longitudinal axis of the cable, wherein at least the cable end of the cable to be aligned is freely rotatable during the rotation of the cable strand;

b. Securing the aligned cable on a section of a free cable end, in particular untwisted, in its ideal rotational position;

c. Repeating steps a. and b. for each additional cable of the cable strand to be aligned, wherein each cable that has already been aligned remains secured in its ideal rotational position on a section of its free cable end, in particular its untwisted cable end.

The core of the invention thus consists of aligning the prefabricated free cable ends, in particular the untwisted cable ends, at one end of the cable strand in the correct rotational position by rotating the cable strand as a whole individually on one section adjacent to the cable ends, one after the other, for each cable and/or cable end to be aligned until the respective cable and/or cable end to be aligned has reached its ideal rotational position, and then securing and/or holding the cable and/or cable end aligned in this way on a section of its cable end after reaching its ideal rotational position, wherein each cable that has already been aligned remains secured in a section of its free in particular untwisted cable end in its ideal rotational position.

In the sense of the present invention, the cable ends of the cable strand to be aligned each refer to the cable ends situated on one end of the cable strand. Furthermore, in the sense of the present invention, the cable ends to be aligned should be present freely at one end of the cable strand, i.e., the association of the cable strand, for example, the twisting, should be released in the area of the cable ends to be aligned, so that with a cable strand that is otherwise twisted, the cable ends and/or the cable strand is untwisted in the area of the cable ends and is preferably also stretched. In the sense of the present invention, however, the cable ends should be "free" in any case to the extent that they are essentially released from one another, gripped independently of one another and moved relative to one another in at least a certain area, in particular being rotatable relative to one another. If the cable ends to be aligned are not yet free of one another, then according to one advantageous embodiment of the invention, it is possible to provide that the cable ends will be "freed," for example, untwisted accordingly before aligning the cable ends and/or that the cable strand (the association of the cable strand, for example, the twisting of the cable strand) will be released in the area of the cable ends to be aligned, for example, being untwisted.

According to an advantageous embodiment of the invention, it may be provided that any cable not yet aligned is secured on a section of its free cable end, in particular an untwisted end, while the cable strand is rotated for alignment of the prefabricated cable end of another cable. This advantageously achieves the result that the free cable ends, in particular untwisted cable ends, of the cable that has not yet been aligned do not interfere with the alignment operation and/or the rotation of the entire cable strand. Likewise the rotation of the entire cable strand is facilitated because it is now secured in a stabilizing manner on two sections spaced a distance apart from one another, namely on the "bound" section of the cable strand and at the end on the sections of the free cable ends, in particular the untwisted ends of the cables that have not yet been aligned.

According to another advantageous embodiment of the invention, it is provided that the actual rotational position of the cable end of at least one cable, in particular each cable to be aligned, is detected before and/or during the rotation of the cable strand. On the one hand, this makes it possible to determine the angle of rotation and the direction of rotation before rotation of the entire cable strand for alignment of a certain cable end. Furthermore, by detecting, the actual rotational position during the rotation of the cable strand, it is possible to implement regulation of the alignment operation.

Furthermore, according to another embodiment of the invention, it is possible to provide that the free cable end, in particular the untwisted cable end, of at least one cable, in particular any cable to be aligned, is guided rotatably, while the cable strand is rotated for alignment of the respective cable end. This advantageously achieves the result that the axis of rotation of the cable end to be aligned is clearly defined, preferably by form-fitting guidance and/or at least partial radial enclosure, so that the rotational process of the cable strand and/or the alignment of the respective cable end is/are additionally stabilized. Furthermore, detection of the actual rotational position is definitely improved by having a fixedly defined axis of rotation for the rotational process of the cable end and/or the alignment process of the cable end.

The object of the present invention is also achieved by the device, described below for alignment of prefabricated cable ends of a cable strand, which has been twisted in particular with at least two cables in the correct rotational position. This is suitable in particular for carrying out the method according to the invention described above. The device according to the invention comprises a rotary gripping device for gripping the entire cable strand on a section of the cable strand connected to the cable ends and for rotating the entire cable strand about its longitudinal axis. The rotary gripping device may be designed like the rotary gripping device described in EP 1 429 430 A1, for example, in order to grip and rotate the entire cable strand instead of a single cable, as described in EP 1 429 430 A2. This is done with the goal of rotating each cable and/or cable end to be aligned individually one after the other until the respective cable and/or cable end to be aligned has reached its ideal rotational position.

To then securely hold each cable and/or cable end so aligned after reaching its ideal rotational position or each cable and/or cable end already aligned, the device according to the invention has—for each of the at least two cables—a one separate cable grip for repeatedly releasable gripping, in particular for securing holding, the cable on one section of a free cable end, in particular the untwisted cable end. In the case of cable strands having more than two cable ends to be processed, more than two cable grips are provided accordingly, i.e., one cable grip for each cable end.

According to one advantageous embodiment of the invention, it is possible to provide that at least one of the cable grips, preferably all the cable grips has/have at least one pair of gripping jaws that are adjustable relative to one another and correspond to one another, that can be brought into a closed position for clamping and securing holding a cable end, into an open position for receiving and releasing a cable end and preferably also into an intermediate position for at least partial radial enclosing and guiding a cable end along its longitudinal cable axis.

Furthermore it is possible to provide that the gripping jaws of the at least one cable grip are designed such as to additionally hold the cable end of at least one additional cable and at least partially enclose it radially in the closed position and preferably also in the intermediate position and guide it along its longitudinal cable axis.

For securing, partially enclosing radially and/or guiding the respective cable ends, the gripping jaws may, each have corresponding gripping troughs and/or receiving troughs. It is conceivable here that the gripping jaws may be designed like the jaws of forceps. For securely holding a cable end in the closed position, the gripping troughs and/or receiving troughs may have a roughened surface or a toothed surface in particular. On the other hand, the troughs and/or the regions of the gripping jaws, which serve only to radially enclose and guide an additional cable end, may have a smooth surface.

To achieve a particularly compact design of the aligning device, it may also be provided that the rotary gripping device and the at least two cable grips are arranged one after the other in the longitudinal direction of a cable strand to be aligned by means of the aligning device, namely in such a way that the at least two cable grips can each grip a free end region, in particular an untwisted and/or stretched end region of the cable strand, one after the other in the direction of the cable strand, and the rotary gripping device may grip a section of the cable strand, which is connected to the free end region, in particular a twisted section.

To assemble the aligning device with a cable strand to be aligned and/or processed, it is provided according to an advantageous embodiment of the invention that the cable strand is first inserted into the rotary gripping device. Depending on the direction of feed of the cable strand into the rotary gripping device, in particular when this is done transversely, in particular at a right angle to the longitudinal direction of the cable strand, it is possible to provide that at least one of the at least two cable grips, preferably all of the cable grips can be fed transversely, in particular at a right angle to the longitudinal direction of a cable strand to be aligned, onto the respective cable end. The supply of the at least one and/or all cable grips may take place with a corresponding feed device, preferably a feed device operated by actuator.

As was the case with the method, with the device according to the invention, it may also be provided that it has a detection device for detecting the respective actual rotational position of the prefabricated cable ends. According to an advantageous embodiment of the invention, the detection device may have a digital camera or an optical projection sensor for detecting and determining the respective actual rotational position of the prefabricated cable ends. Furthermore, the detection device may comprise a lighting device for illuminating and/or generating a projected image. In addition, the detection device may also comprise an image analysis device, for example, a computer-based image analysis device, which implements the corresponding image analysis software, which is suitable for determining the actual rotational position of the prefabricated cable end from the detected image of the cable end and/or the projected image of the cable end. Such detection devices are fundamentally known from the prior art, for example, EP 1 429 430 A2.

According to another advantageous embodiment of the invention, it is possible to provide that at least portions of the detection device, in particular the digital camera or the projection sensor are arranged on the front end or at the side radially in the region of the cable ends to be aligned. Such an arrangement allows a particularly reliable and accurate detection and determination of the respective actual rotational position of the prefabricated cable ends.

For controlling, preferably regulating the alignment operation, the device may also comprise a control unit which is preferably operatively connected for the controlled, in particular regulated alignment of the prefabricated cable ends in the respective ideal rotational position with the rotary gripping device, the at least two cable grips and the detection device.

The invention also relates to a cable assembly device for assembly of plug housings with prefabricated cable ends of a cable strand, in particular a twisted cable strand comprised of multiple cables, wherein the cable assembly device has an alignment device according to the invention for aligning the prefabricated cable ends in the correct rotational position with respect to the plug housings to be assembled.

Additional goals, advantages and possibly applications of the present invention are derived from the following description of an exemplary embodiment of the invention as well as on the basis of the accompanying figures.

They show:

FIGS. 1 A-B perspective view of a possible exemplary embodiment of the aligning device according to the invention;

FIGS. 1A-B, 2A-B and 3A-D show one possible exemplary embodiment of an aligning device 1 according to the invention for aligning prefabricated cable ends 111, 121 of a cable strand 100, in particular twisted, comprised of two cables 110, 210 in the present case, in the correct rotational position. The device 1 is suitable in particular for carrying out the method according to the invention. The device 1 consists of a rotary gripping device 30 in the form of a pivoting grip which can grip and pivot the twisted cable pair 100. Furthermore the aligning device 1 has two separate cable grips 10, 20 for releasable gripping, in particular securely holding the stretch and/or untwisted cable 111, 121 of the cable pair 100. The device 1 also has a digital camera 41 with a respective lighting device and with an image analysis device (not shown here) for detecting and determining the respective actual rotational position of the prefabricated cable ends 111, 121.

Figure 1A:
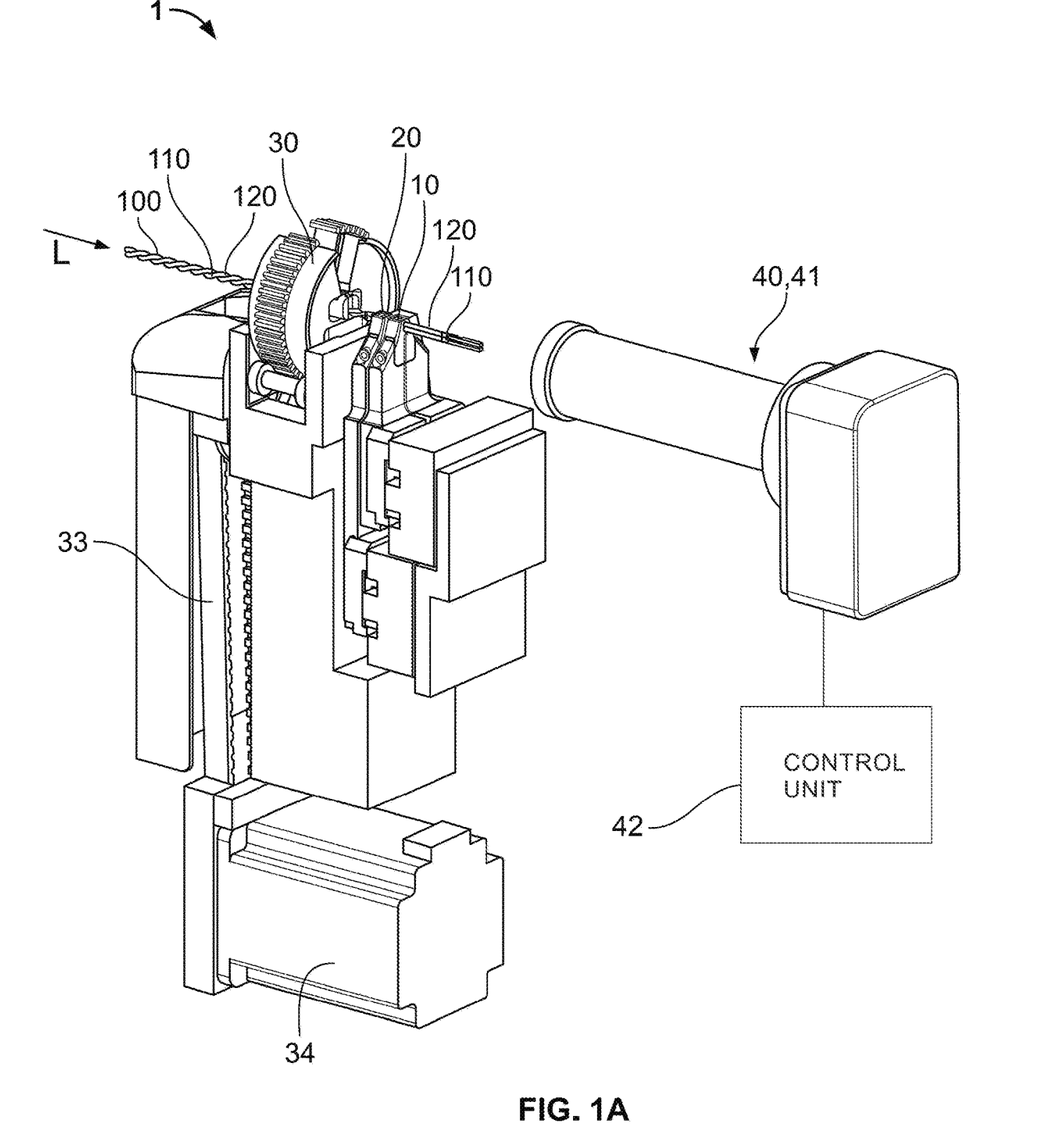
Figure 1B:
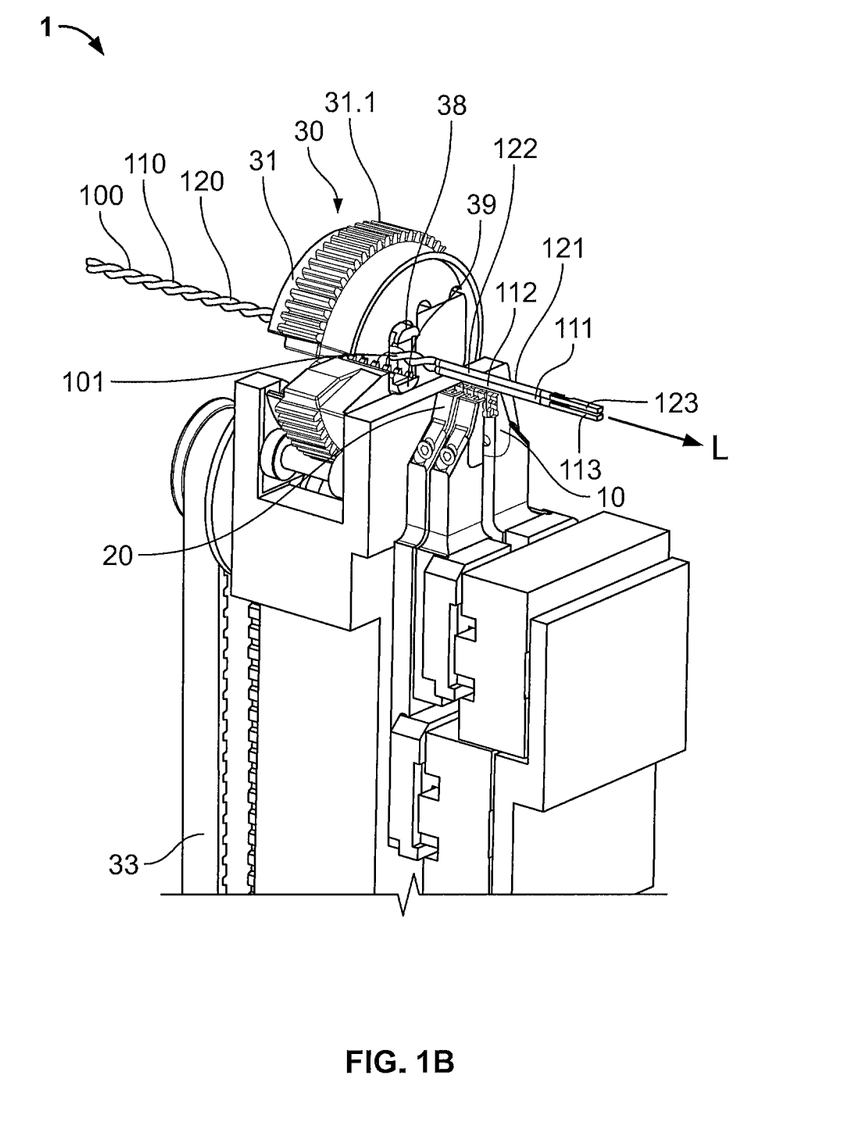
Figure 2A:
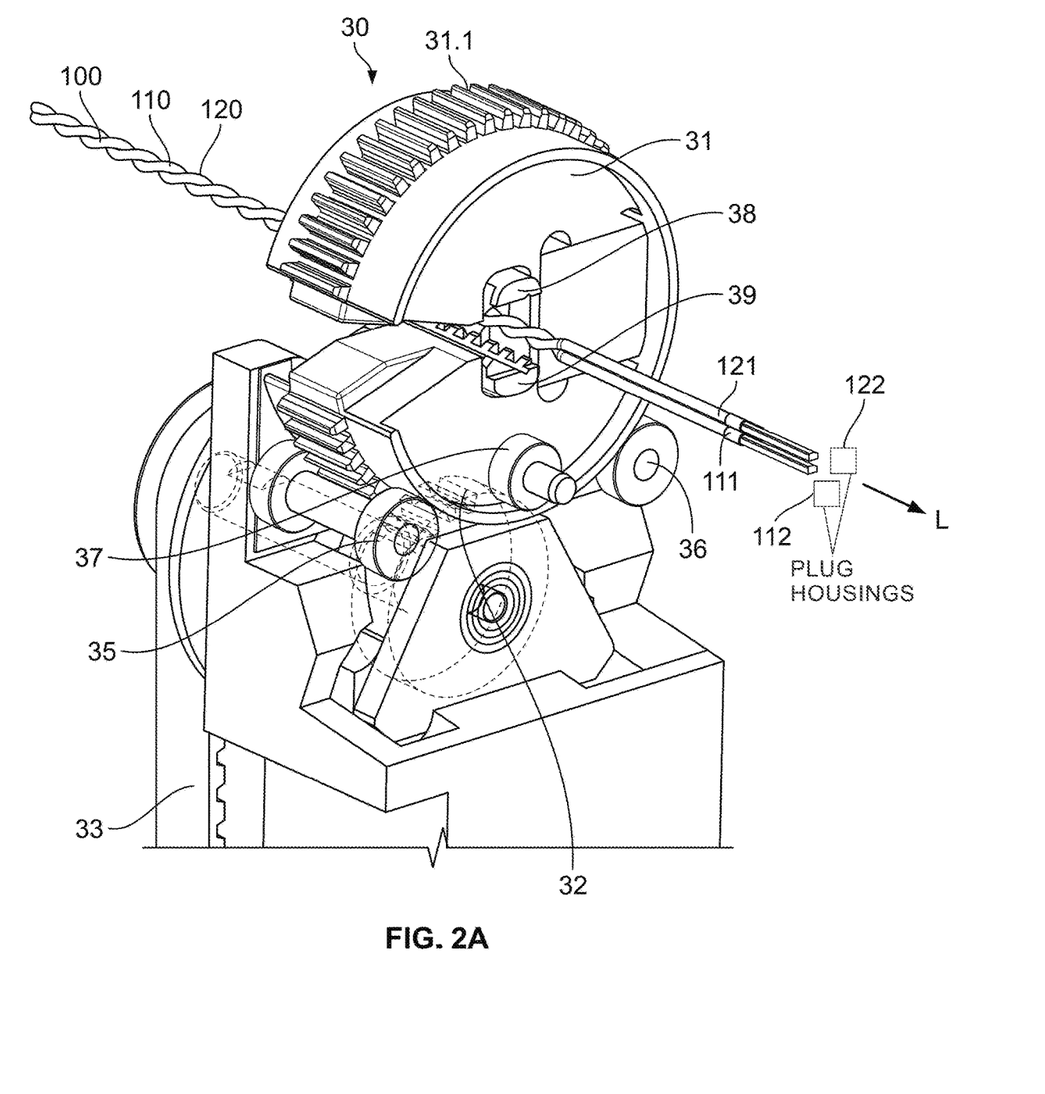
FIGS. 2A-B detailed view of the rotary gripping device of the exemplary aligning device according to FIG. 1A.
Figure 2B:
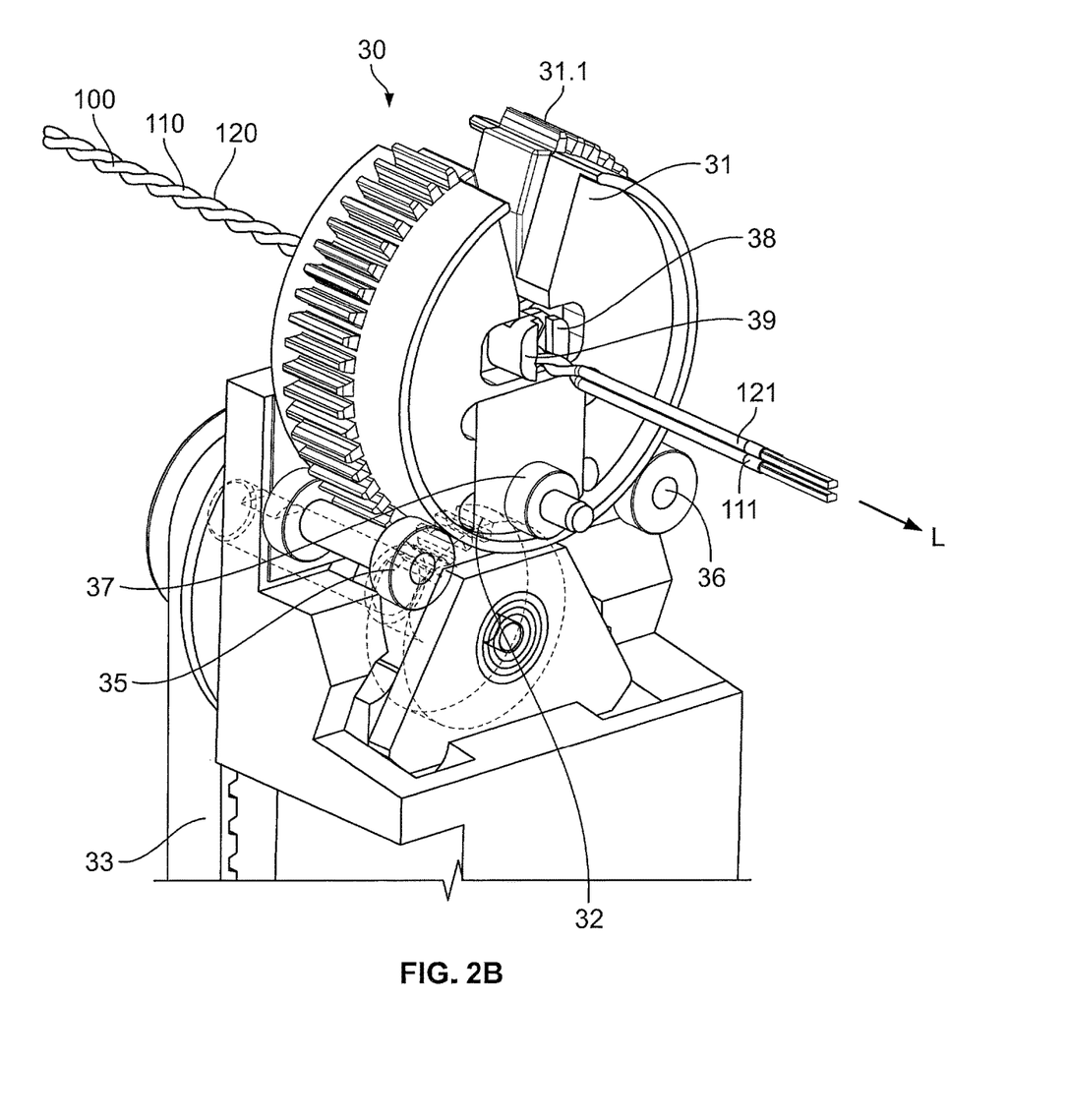

FIGS. 2A and B shows details of the exemplary embodiment of the rotary gripping device 30, which is implemented in the present case in the form of a pivoting grip 30 such as that known from EP 1 429 430 A2, for example. The housing 31 of the pivoting grip 30 has teeth 31.1 on the periphery by means of which the pivoting grip can be rotated smoothly with the help of a pinion 32. The pinion 32 is driven by a toothed belt 33 with the help of a pivot motor 34 (cf. FIGS. 1A and 1B). The housing 31 sits on two support rollers 35, 36 on its front and back sides and is held by mating roller 37 in such a way that only a guided pivoting movement about the central axis of the toothed housing 31 is possible. A pneumatic drive/actuator which can close two gripping jaws 38, 39 centrally is integrated into housing 31. To make it possible to introduce the cable pair into the pivot grip and/or the rotary grip device, the housing 31 which is toothed on the periphery is cut away in the form of a wedge at one location. FIG. 2A shows one possible rotary gripping position in which the cable pair 100 can be introduced horizontally into the rotary gripping device 30. On the other hand, FIG. 2B shows the rotary gripping device 30 and/or the pivot grip 30 after being pivoted 90° clockwise and after gripping jaws 38, 39 have been closed. Additional details regarding the rotary gripping device 30 can be taken from the above mentioned EP 1 429 430 A2.

The two cable grips 10, 20 are arranged one after the other in front of the rotary gripping device 30 and/or the pivot grip 30, as shown in particular in FIGS. 1a and 1b. For the case when the cable pair 100 is introduced horizontally into the aligning device 1 (cf. FIG. 2a), the cable grips 10, 20 can additional be lowered jointly transversely to the longitudinal axis L of the cable strand and/or the cable pair 100.

Figure 3A:
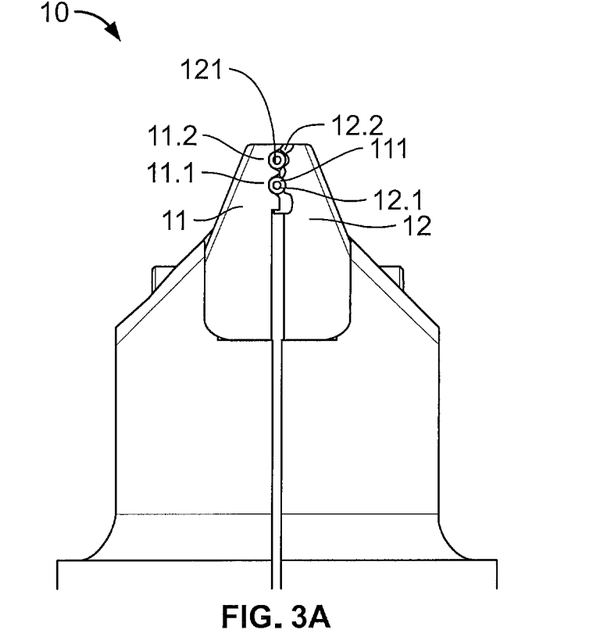
FIGS. 3A-D detailed front view of the cable grips of the exemplary aligning device according to FIG. 1A.
Figure 3B:
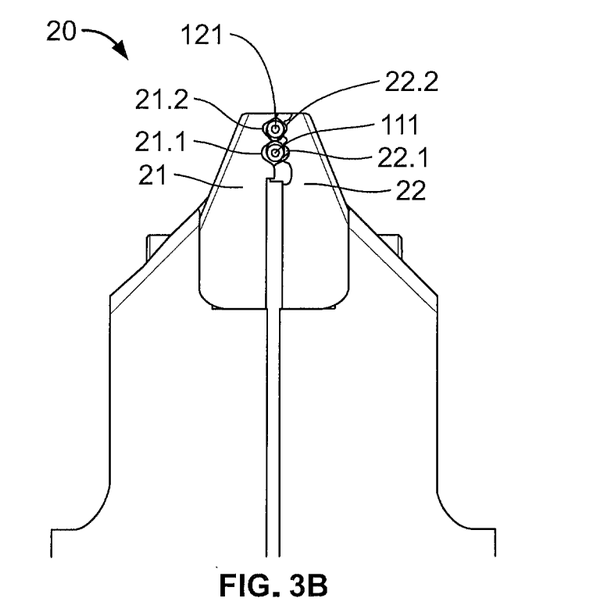
Figure 3C:
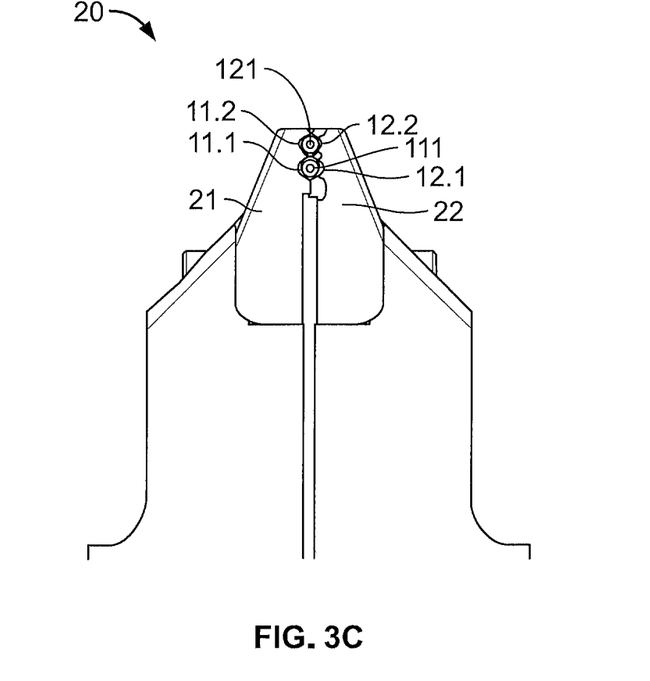
Figure 3D:
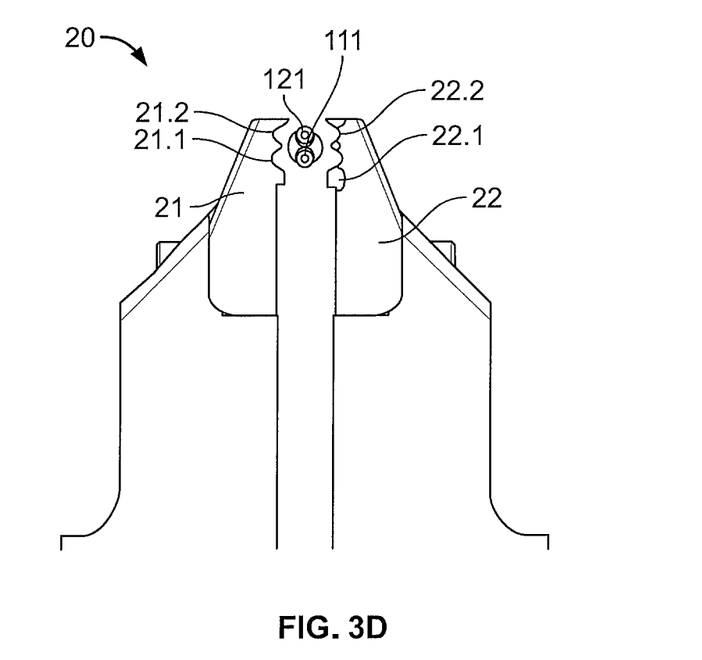

FIGS. 3A-D show additional details of the two cable groups 10, 20. Each of the cable grips 10, 20 has two gripping jaws 11, 12; 21, 22 designed so that they clamp one cable end 111, 121 in a closed position of the cable grip 10, 20, and they only enclose the second cable end 121, 111 and lead it in a form-fitting manner along its longitudinal cable axis L. FIG. 3A shows the first cable grip 10 in the closed position, wherein the cable end 111 at the bottom is clamped by the cable end 121 at the top is only guided axially. FIG. 3B shows the second cable grip 20 whose gripping jaws 21, 22 are designed so that the cable end 121 at the top is clamped by the cable end 111 at the bottom is only guided axially. FIG. 3D shows as an example the second cable grip 20 in the open position which serves to receive and release the two cable ends 111, 121. Furthermore, in addition to the open position and the closed position, the two cable grips 10, 20 may also be brought into a third position, the so-called intermediate position, in which the gripping jaws 11, 12; 21, 22 are only slightly open in order to enclose the cable ends 111, 121 at least partially radially and guide them along the longitudinal cable axis. FIG. 3C shows as an example the second cable grip 20 in this intermediate position, in which none of the cables 110, 120 and/or cable ends 111, 121 is clamped but instead the cable is guided in an encompassing manner, so that the two cable ends 111, 121 can be rotated about their respective longitudinal axes, but captured between the gripping jaws 21, 22 at the same time. The exemplary embodiment of the two cable grips 10, 20 shown here may be implemented with a pneumatically operable three-position grip or a hybrid grip, such as that known from EP 2 317 613 A1, for example.

The detection device 40 shown in FIG. 1A comprises a digital camera 41 with integrated lighting and an image analysis device. The digital camera sends its images to the image analysis device which communicates with a control unit 42 of the aligning device 1. The purpose of the image analyzing device is to determine the angular position of the two prefabricated cable ends 111, 121, in particular the contacts 113, 123 attached there, relative to a reference direction, for example, relative to the horizontal. In addition, it is possible to determine from this angular position by which amount and in which direction the two contacts 113, 123 must each be rotated to achieve the ideal rotational position as desired for the assembly of the plug housings 112, 122 shown in FIG. 2A. The control unit 42 preferably takes over the determination of the direction of rotation and the amount of the rotational angle.

Depending on the design, it is alternatively possible with some contacts to use a simpler optical projection sensor instead of the digital camera 41. Thus, in the base of a flat contact with a rectangular cross section, for example, the angular position of the contact could be determined from the width of the shadow image on the sensor with the assistance of a line sensor. To do so, the line sensor may preferably be arranged transversely to the longitudinal cable axis L. However, the digital camera 41 shown in the present exemplary embodiment represents the most flexible approach which can be used universally for different contacts. The digital camera 41, as shown in the present exemplary embodiment, is preferably disposed on the front side of the cable ends 111, 121 to be aligned.

One possible exemplary embodiment of the aligning method according to the invention is explained below, using the exemplary embodiment of the aligning device 1 according to the invention as described above. First, the cable pair 100 with the cable ends 111, 121 to be aligned is introduced into the rotary gripping device 30 and/or the pivot grip 30 (cf. FIG. 2a) in the area of the twisted section adjacent to the cable ends 111, 121, and then rotated by 90° into the starting position (FIG. 2b). After introducing the cable pair 100 into the gripping device, an aligning operation is carried out with each of the two cables 110, 120, if necessary, separately in each case. In the exemplary embodiment shown here, however, the contact 113 already has a sufficiently accurate angular position on the cable end 111 of the cable 110, so that only the rotation of the contacts 113, 123 relative to one another must be corrected. For this purpose, it is sufficient to carry out the aligning operation according to the invention only with the other cable end 121 of the cable 120, which has not yet been oriented in the correct rotational position.

The method is preferably carried out as a controlled and/or regulated method. The control and/or regulation of the aligning operation take(s) place on the basis of the angular position of the contacts 113, 123 detected by the digital camera 41 and determined by the image processing device, as described above. To this end, a comparison is made with saved ideal values for the position of the contacts 113, 123, their allowed deviation and the allowed rotation. Based on this comparison, the control unit 42 then determines the angle correction to be implemented for each cable end 111, 121 or in the present case for only one cable end 121.

Figure 4A:
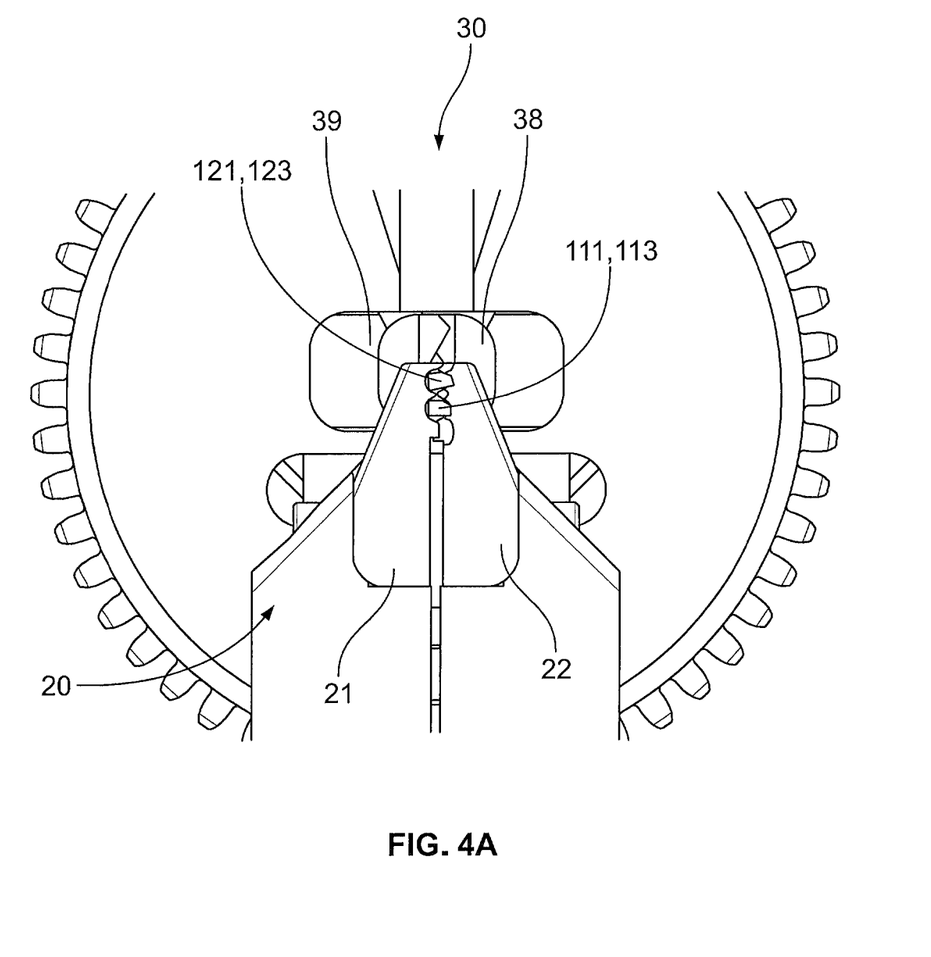
FIGS. 4A-C illustration of one possible exemplary embodiment of the method according to the invention with the help of the exemplary aligning device according to FIG. 1A.
Figure 4B:
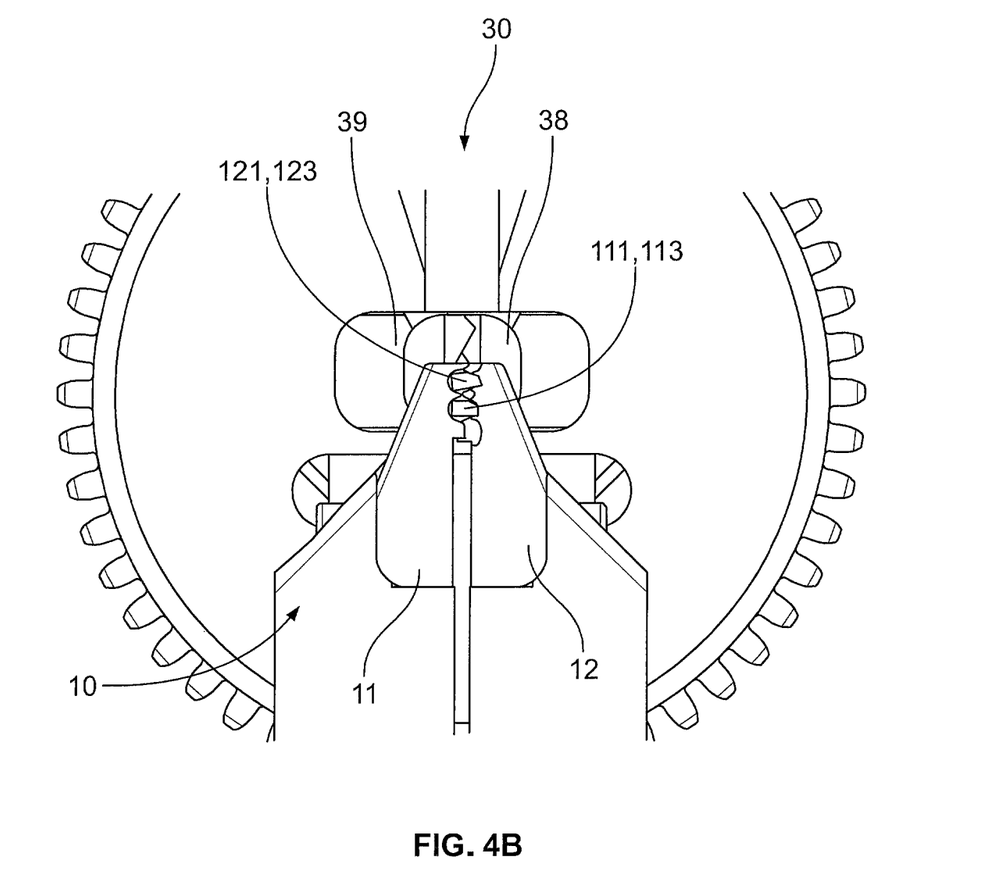
Figure 4C:
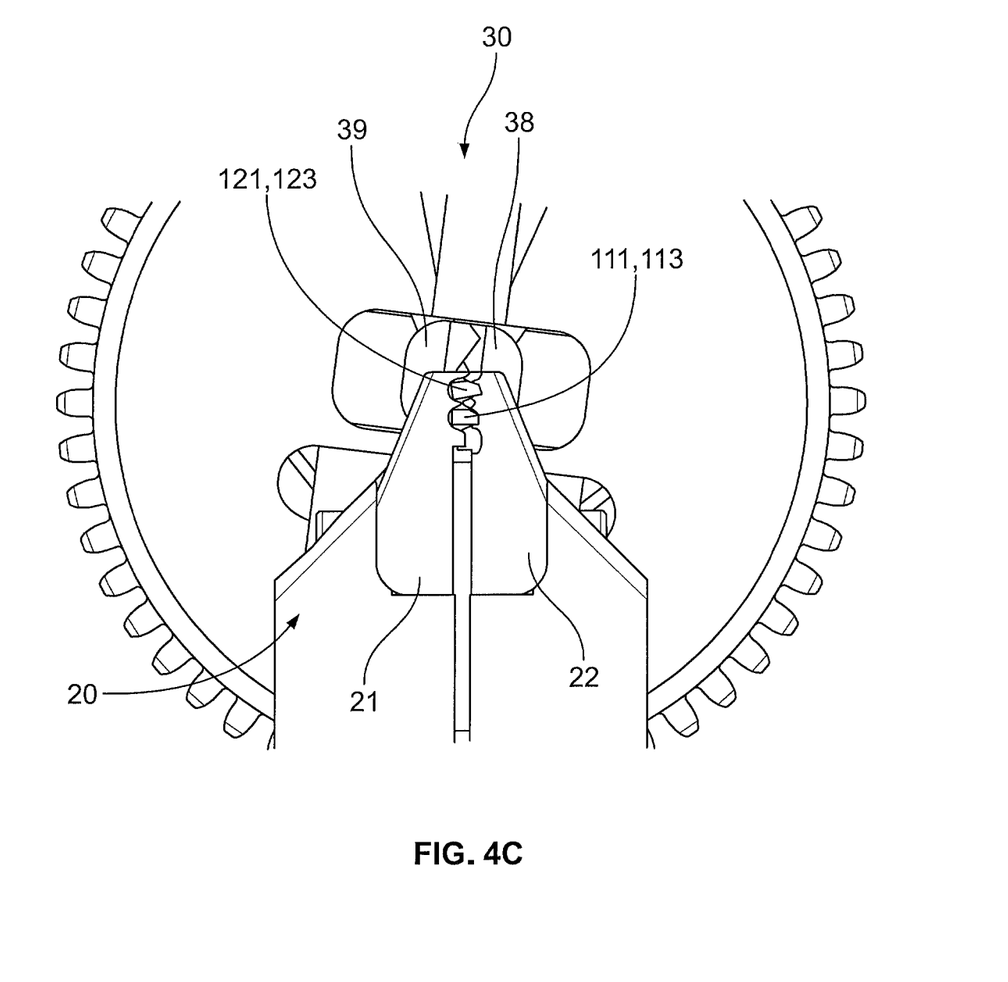

FIGS. 4A-C show the aligning operation for the cable end 121 situated at the top there. The cable end 111 situated at the bottom remains clamped in the first cable grip 20 because the cable end 111 situated at the bottom and/or the contact element 113, 123 attached there is already in a sufficiently accurate angular position with respect to its ideal rotational position, as explained above. According in the first step (cf. FIG. 4A), the first cable grip 10 and the rotary gripping device 30 are closed. Then the second cable grip 20 is opened at least to the intermediate position (FIG. 4B) to permit free rotation of the cable end 121 situated at the top. Alternatively, the second cable grip 20 could also be opened to the open position because the cable end 121 to be aligned, which is the cable end at the top, is already being guided, so that it is freely rotatable in the first cable grip 10 in the closed position (FIG. 3A and FIG. 4A).

In the next step, to align the upper cable end 121, the twisted cable pair 100 is rotated with the help of the pivot grip 30, so that the free upper cable end 121 is also rotated. In the general case, the cable end 121 is not necessarily rotated by the same angle as the pivot grip 30 and/or the rotary gripping device 30, so the final position of the upper cable end 121 must be checked by the control unit with the help of the detection device 40 and corrected, if necessary. In the ideal case, this may be done during the rotation of the rotary gripping device 30 in the sense of a regulating operation. After reaching the correct actual rotational position, the second cable grip is also closed to secure and/or hold the upper cable end 121 in the desired actual rotational position. This is how the aligning operation for both cable ends 111, 121 is concluded.

The invention claimed is:

1. A device for aligning first and second prefabricated cable ends of a twisted cable strand in a correct rotational position, the twisted cable strand comprising a first cable having the first prefabricated cable end and a second cable having the second prefabricated cable end, the first and second cables being twisted together and a twisted section connected to the first and second prefabricated cable ends, the first and second prefabricated cable ends being free and untwisted, wherein the device comprises:

a rotary gripping device for gripping the twisted section and for rotating the twisted cable strand about a longitudinal axis of the twisted cable strand, a first cable grip for releasably gripping the first cable when the first cable is aligned via the rotary gripping device in the correct rotational position, on a section of the first prefabricated cable end of the first cable, the first cable grip comprising at least one first pair of gripping jaws adjustable relative to one another, said at least one first pair of gripping jaws being movable into a closed position for securely holding and clamping the first prefabricated cable end of the first cable, said at least one first pair of gripping jaws being movable into an open position for receiving and releasing the first prefabricated cable end of the first cable, and said at least one first pair of gripping jaws being movable into an intermediate position for at least partial radial enclosing and guiding of the first prefabricated cable end of the first cable along a longitudinal axis of the first cable, a second cable grip for releasably gripping the second cable when the second cable is aligned via the rotary gripping device in the correct rotational position, on a section of the second prefabricated cable end of the second cable, the second cable grip comprising at least one second pair of gripping jaws adjustable relative to one another, said at least one second pair of gripping jaws being movable into a closed position for securely holding and clamping the second prefabricated cable end of the second cable, said at least one second pair of gripping jaws being movable into an open position for receiving and releasing the second prefabricated cable end of the second cable, and said gripping jaws being movable into an intermediate position for at least partial radial enclosing and guiding of the second prefabricated cable end of the second cable along a longitudinal axis of the second cable, a detection device configured to detect a respective actual rotational position of the first and second prefabricated cable ends, and a control unit operatively connected to the rotary gripping device, the separate cable grip, and the detection device for regulated alignment of the first and second prefabricated cable ends in their respective correct rotational position with the rotary gripping device, wherein the rotary gripping device and the first and the second cable grips are arranged one after another in the longitudinal direction, and wherein the at least one first and second pairs of gripping jaws are configured to additionally hold a cable end of at least one additional cable and at least partially enclose the cable end of the at least one additional cable radially in the closed position and guide it along a longitudinal axis of the at least one additional cable.

2. The device according to claim 1, wherein the at least one first pair of gripping jaws has corresponding gripping troughs or receiving troughs for securing, partial radial encompassing and/or guidance of the first prefabricated cable end and the at least one second pair of gripping jaws has corresponding gripping troughs or receiving troughs for securing, partial radial encompassing and/or guidance of the second prefabricated cable end.

3. The device according to claim 1, wherein the first and the second cable grips are configured to be fed transversely to the longitudinal direction of the twisted cable strand.

4. The device according to claim 1, wherein the detection device comprises:
   a digital camera for detecting and determining the actual rotational position of the first prefabricated cable end and the actual rotational position of the second prefabricated cable end, or
   an optical projection sensor.

5. The device according to claim 4, wherein the detection device further comprises an image analysis device.

6. The device according to claim 4, wherein at least a part of the detection device is positioned on a front side or radially at a side in an area of the first and second prefabricated cable ends.

7. An apparatus comprising
   plug housings; and
   the device according to claim 1,
   wherein the apparatus is configured to insert the first and second prefabricated cable ends of the twisted cable strand into chambers of the plug housings, and
   wherein the device according to claim 1 aligns the first and second prefabricated cable ends in the correct rotational position with respect to the plug housings.

* * * * *

UNITED STATES PATENT AND TRADEMARK OFFICE
CERTIFICATE OF CORRECTION

PATENT NO.       : 10,723,584 B2
APPLICATION NO.  : 15/722256
DATED            : July 28, 2020
INVENTOR(S)      : Estermann et al.

It is certified that error appears in the above-identified patent and that said Letters Patent is hereby corrected as shown below:

On the Title Page

Item [72], "Untaraegeri (CH)" should read: --Unteraegeri (CH)--.

Signed and Sealed this
Twenty-second Day of September, 2020

Andrei Iancu
*Director of the United States Patent and Trademark Office*